(12) United States Patent
Jonsson (10) Patent No.: US 8,737,950 B2
(45) Date of Patent: May 27, 2014

(54) VERIFYING CALENDAR INFORMATION THROUGH PROXIMATE DEVICE DETECTION

(75) Inventor: Håkan Lars Emanuel Jonsson, Hjärup (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 482 days.

(21) Appl. No.: 13/050,240

(22) Filed: Mar. 17, 2011

(65) Prior Publication Data

US 2012/0238248 A1    Sep. 20, 2012

(51) Int. Cl.
*H04M 11/04*    (2006.01)
(52) U.S. Cl.
USPC ....... 455/404.2; 455/457; 455/459; 455/41.1; 455/41.2; 705/8; 705/9
(58) Field of Classification Search
USPC .................................................... 455/404.2
See application file for complete search history.

(56) References Cited

U.S. PATENT DOCUMENTS

| | | | | |
|---|---|---|---|---|
| 7,725,342 | B2 * | 5/2010 | Keohane et al. | 705/7.19 |
| 2010/0317371 | A1 * | 12/2010 | Westerinen et al. | 455/456.6 |
| 2011/0244892 | A1 * | 10/2011 | MacManus et al. | 455/457 |

FOREIGN PATENT DOCUMENTS

| | | |
|---|---|---|
| WO | 2007/147261 A1 | 12/2007 |
| WO | 2008/091433 A1 | 7/2008 |

OTHER PUBLICATIONS

Extended European Search Report dated Jun. 1, 2012 issued in corresponding European application No. 12151539.9, 6 pages.

* cited by examiner

*Primary Examiner* — Charles Appiah
*Assistant Examiner* — Randy Peaches
(74) *Attorney, Agent, or Firm* — Snyder, Clark, Lesch & Chung, LLP (57) ABSTRACT

A device stores a context aware application, and a calendar application that further stores data related to a scheduled meeting. The device receives local connectivity identification (LCID) information from one or more other devices that are proximate to the device. The device determines a likelihood that a user of the device is present at the scheduled meeting based on data related to the received LCID information from the one or more other devices that are proximate to the device. The device selectively executes a function associated with a context aware application based on the likelihood that the user is present at the scheduled meeting.

19 Claims, 9 Drawing Sheets

VERIFYING CALENDAR INFORMATION THROUGH PROXIMATE DEVICE DETECTION

BACKGROUND

Electronic devices, such as, for example, computers and cellular telephones, may utilize calendar applications that permit the users of the devices to schedule events in electronic calendars that assist those users in keeping track of events that they need to remember. Such calendar applications are useful in providing reminders to the users of upcoming events such as weddings, family holidays, family get-togethers, or other types of events.

SUMMARY

In one exemplary embodiment, a method may include obtaining, at a mobile device associated with a user, local connectivity identification (LCID) information over first wireless connections from one or more devices that are proximate to the mobile device, and retrieving a list of invited participants to a meeting from a calendar application installed at the mobile device. The method may further include obtaining a confidence value that is associated with a likelihood that the user is physically present at the meeting based on data related to the LCID information, and determining whether the meeting is a valid context for the user based on the confidence value. The method may also include selectively executing one or more functions associated with at least one context aware application installed at the mobile device based on whether the meeting is a valid context for the user.

Additionally, the method may include obtaining confidence values associated with the invited participants to the meeting, and comparing the confidence values associated with the invited participants with the confidence value that is associated with a likelihood that the user is physically present at the meeting.

Additionally, determining whether the meeting is a valid context for the user may further be based on the comparison of the confidence values associated with the invited participants with the confidence value that is associated with the likelihood that the user is physically present at the meeting.

Additionally, the LCID information may include Medium Access Control (MAC) addresses associated with the one or more devices that are proximate to the mobile device.

Additionally, the MAC addresses may include BlueTooth MAC addresses.

Additionally, the method may include obtaining location information associated with the mobile device, and determining whether the meeting is a valid context for the user may further be based on the obtained location information.

Additionally, the location information may include a radio base station cell identifier or a wireless network access point identifier associated with a location of the mobile device.

Additionally, the method may further include determining, from the calendar application, whether the meeting is actually currently occurring, or is about to occur, and obtaining the LCID information from the one or more devices may be based on whether the meeting is currently occurring or is about to occur.

Additionally, selectively executing the one or more functions may include one of: switching the mobile device to a silent mode such that mobile device does not ring, but only vibrates or displays a visual indication, when incoming calls and/or messages are received; routing incoming calls to voicemail based on whether the meeting is a valid context for the user; or displaying information associated with the meeting on the mobile device, wherein the information includes at least one of invited participant information, information showing which invited participants are actually present at the meeting, or documents associated with the meeting.

In another exemplary embodiment, a device may include a memory configured to store a context aware application and a calendar application that further stores data related to a scheduled meeting, and a first communication interface configured to receive local connectivity identification (LCID) information from one or more other devices that are proximate to the device. The device may further include a processing unit configured to: determine a likelihood that a user of the device is present at the scheduled meeting based on data related to the received LCID information from the one or more other devices that are proximate to the device, and selectively execute a function associated with a context aware application based on the likelihood that the user is present at the scheduled meeting.

Additionally, the device may further include a second communication interface configured to send the LCID information to a server.

Additionally, the processing unit may be further configured to retrieve a list of invited participants to the scheduled meeting and wherein the second communication interface is further configured to send the list of invited participants to the server.

Additionally, the second communication interface may be further configured to receive a confidence value, generated by the server based on the LCID information, that indicates a likelihood that the user is present at the scheduled meeting, and the data related to the received LCID information may include the confidence value.

Additionally, the second communication interface may further be configured to receive confidence values associated with a plurality of invited participants to the scheduled meeting, and the data related to the received LCID information may include the received confidences values associated with the plurality of invited participants.

Additionally, the LCID information may include Medium Access Control (MAC) addresses associated with the one or more other devices that are proximate to the device.

Additionally, the device may include a desktop, laptop, palmtop, or tablet computer; a cellular telephone; a personal digital assistant (PDA); a media player device; or a digital camera.

Additionally, when selectively executing the function, the processing unit may be configured to: switch the device to a silent mode such that the device does not ring, but only vibrates or displays a visual indication, when incoming calls and/or messages are received.

Additionally, when selectively executing the function, the processing unit may be configured to: route incoming calls to voicemail based on the likelihood that the user is present at the scheduled meeting.

Additionally, when selectively executing the function, the processing unit may be configured to: display information associated with the meeting on the device, wherein the information includes at least one of invited participant information, information showing which invited participants are actually present at the meeting, or documents associated with the meeting.

In yet another exemplary embodiment, a computer-readable medium containing instructions executable by at least one processing unit may include one or more instructions for managing calendar information associated with a calendar application installed at a mobile device, and one or more instructions for obtaining local connectivity identification (LCID) information over wireless connections from one or more devices that are proximate to the mobile device. The computer-readable medium may further include one or more instructions for verifying at least a portion of the calendar information based on the obtained LCID information from the one or more devices that are proximate to the mobile device.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Figure 1:
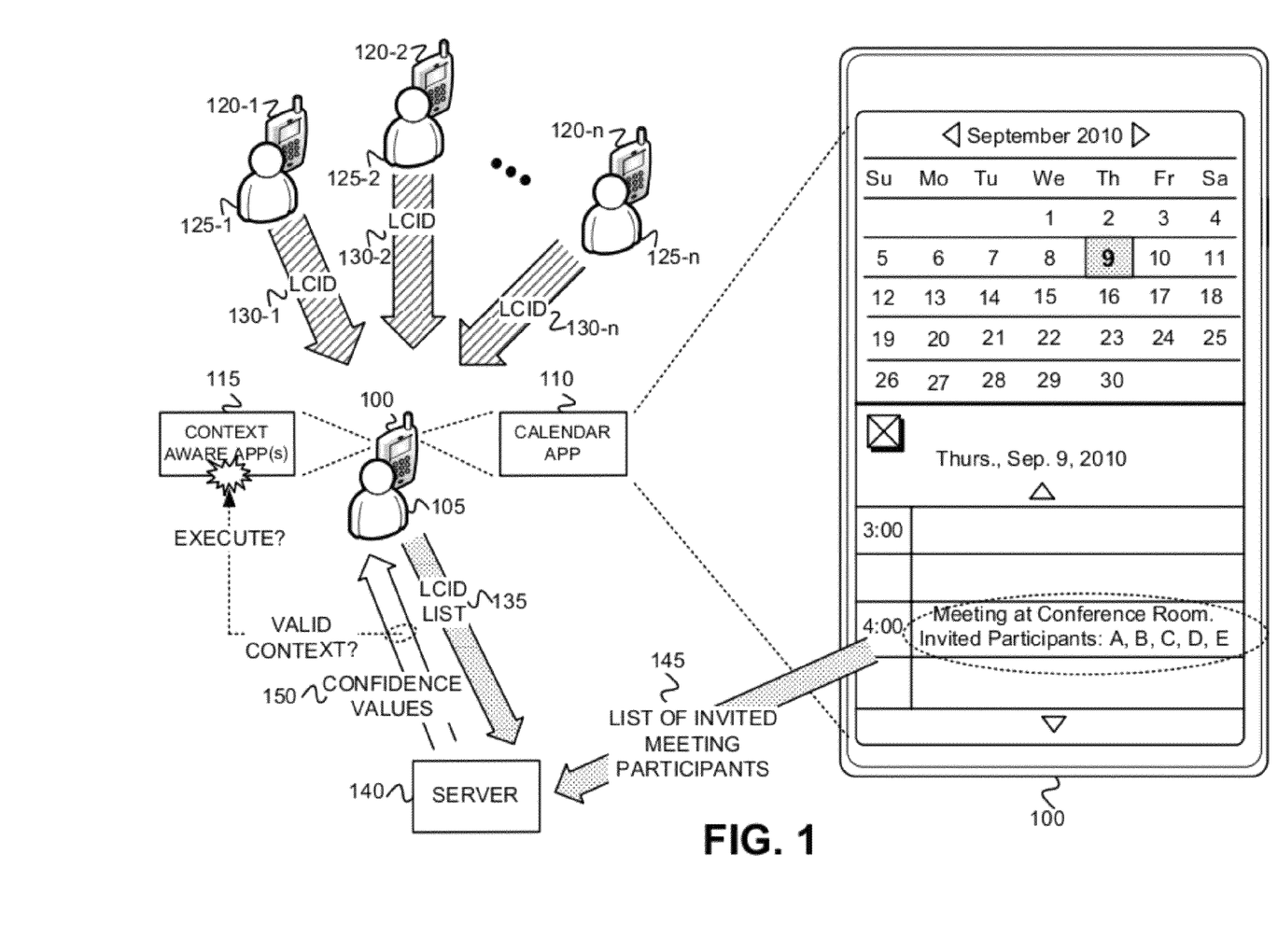
FIG. 1 illustrates an overview of the selective execution of a function associated with a context aware application installed at a mobile device based on a determination of whether a user of the mobile device is actually physically present at a meeting scheduled in a calendar application installed at the mobile device.

FIG. 1 illustrates an overview of the selective execution of a function associated with a context aware application installed at a mobile device based on a determination of whether a user of the mobile device is actually physically present at a meeting scheduled in a calendar application installed at the mobile device. As shown in FIG. 1, a mobile device 100, being used by a user 105, may have a calendar application (app) 110 and a context aware app(s) 115 installed on device 100. Mobile device 100 may include any type of digital computing device that has the capability to communicate via one or more wireless network connections (e.g., wireless cellular, BlueTooth wireless, "wi-fi," etc.). Mobile device 100 may include, for example, a computer (e.g., a desktop, laptop, palmtop, or tablet computer), a cellular telephone (e.g., a smart phone), a personal digital assistant (PDA), a media player device, or a digital camera.

Calendar application 110, as further shown in expanded detail in the right-most portion of FIG. 1, may maintain a schedule of calendar events where the calendar events may include scheduled meetings. Each of the scheduled meetings may have an associated date, time and location and a set of invited meeting participants. The set of invited meeting participants may include a list of names of people invited to the meeting and possibly a list of associated contact information (e.g., phone numbers, email addresses, instant message (IM) screen names, etc.). The scheduled meetings stored in calendar application 110 may be manually entered into mobile device 100 by user 105, or may be automatically entered based on invitation messages received at device 100 that include details of the meeting.

Context aware application 115 may include any type of application installed on mobile device 100 that may determine a context of user 105 and/or mobile device 100 and that may selectively execute one or more functions based on the determined context. A "context," as referred to herein, includes a location of user 105 in relation to meetings scheduled in calendar application 110. Therefore, a valid "context" for user 105 may occur when user 105 is determined to be present at a location where a scheduled meeting is currently supposed to be held, or is about to be held. Context aware application 115 may selectively execute functions, such as, for example, switching mobile device 100 to a "silent" mode, or routing incoming calls to voicemail based on a determined context of user 105 and/or mobile device 100. For example, if it is determined that user 105 is actually physically present at a meeting current scheduled in calendar application 110, then context aware application 115 may switch mobile device 100 to a "silent" mode such that mobile device 100 does not ring, but only vibrates or displays a visual indication, when incoming calls and/or messages are received.

Context aware application 115 may selectively execute other functions associated with the determined context of user 105 and/or device 100, such as, for example, displaying meeting information on device 100, including invited participant information, information showing which invited participants are actually present at the meeting, and/or documents attached to the meeting invitation. The documents that may be displayed at device 100 may include a flyer associated with the meeting, program information associated with the meeting, reference materials for use during the meeting, etc. Context aware application 115 may selectively change a profile associated with user 105 that is stored at mobile device 100 based on the determined context of user 105.

When calendar application 110 determines that a scheduled meeting is occurring, or will occur within a short period of time, mobile device 100 may obtain Local Connectivity Identification (LCID) information from each device that is proximate to mobile device 100. Mobile device 100 may obtain the LCID information via one or more wireless connections between device 100 and the other proximate devices. The one or more wireless connections may operate based on short range wireless protocols, such as, for example, BlueTooth, that may create Personal Area Networks (PANs). The LCID information may include any type of LCID that uniquely identifies the device, that is proximate to mobile device 100, and which is valid within the protocol used to establish the wireless connections between mobile device 100 and the other devices. The LCID information may include a network address, such as, for example, a Medium Access Control (MAC) address (e.g., a BlueTooth MAC address) associated with each proximate device.

FIG. 1 depicts devices 120-1 through 120-n, with their respective users 125-1 through 125-n, that are proximate to mobile device 100. As shown in FIG. 1, each of devices 120-1 through 120-n may send a respective LCID 130-1 through 130-n to mobile device 100. In turn, mobile device 100 may send a LCID list 135, that lists each of LCIDs 130-1 through 130-n received from proximate devices 120-1 through 120-n, to a remote server 140. Additionally, mobile device 100 may retrieve a list 145 of invited meeting participants for the scheduled meeting that is occurring, or that will occur within a short period of time, from calendar app 110. Mobile device 100 may send the list 145 to server 140.

Upon receipt of LCID list 135 and invited meeting participant list 145, server 140 may generate a confidence value that represents how likely it is that user 105 is actually physically present at the meeting. Server 140 may similarly receive LCIDs and invited meeting participant lists (not shown) from other meeting participants invited to the meeting, and may generate a confidence value for each of the other invited meeting participants. Server 140 may send the generated confidence values 150 to mobile device 100.

Mobile device 100, as described in further detail below, may determine a likelihood that user 105 is present at the meeting based on user 105's confidence value received from server 140. Additionally, mobile device 100, as described further below, may also determine which invited meeting participant(s) is most likely to be present at the meeting based on a comparison of user 105's confidence value and the confidence values of other invited meeting participants. Mobile device 100 may determine whether the meeting is a valid context for user 105 (i.e., whether user 105 is present at the meeting) based on the determined likelihood that user 105 is present at the meeting and/or based on the comparison of user 105's confidence value and the confidence values of other invited meeting participants. Context aware app(s) 115 may be selectively executed based on whether the meeting is determined to be a valid context for user 105.

Figure 2:
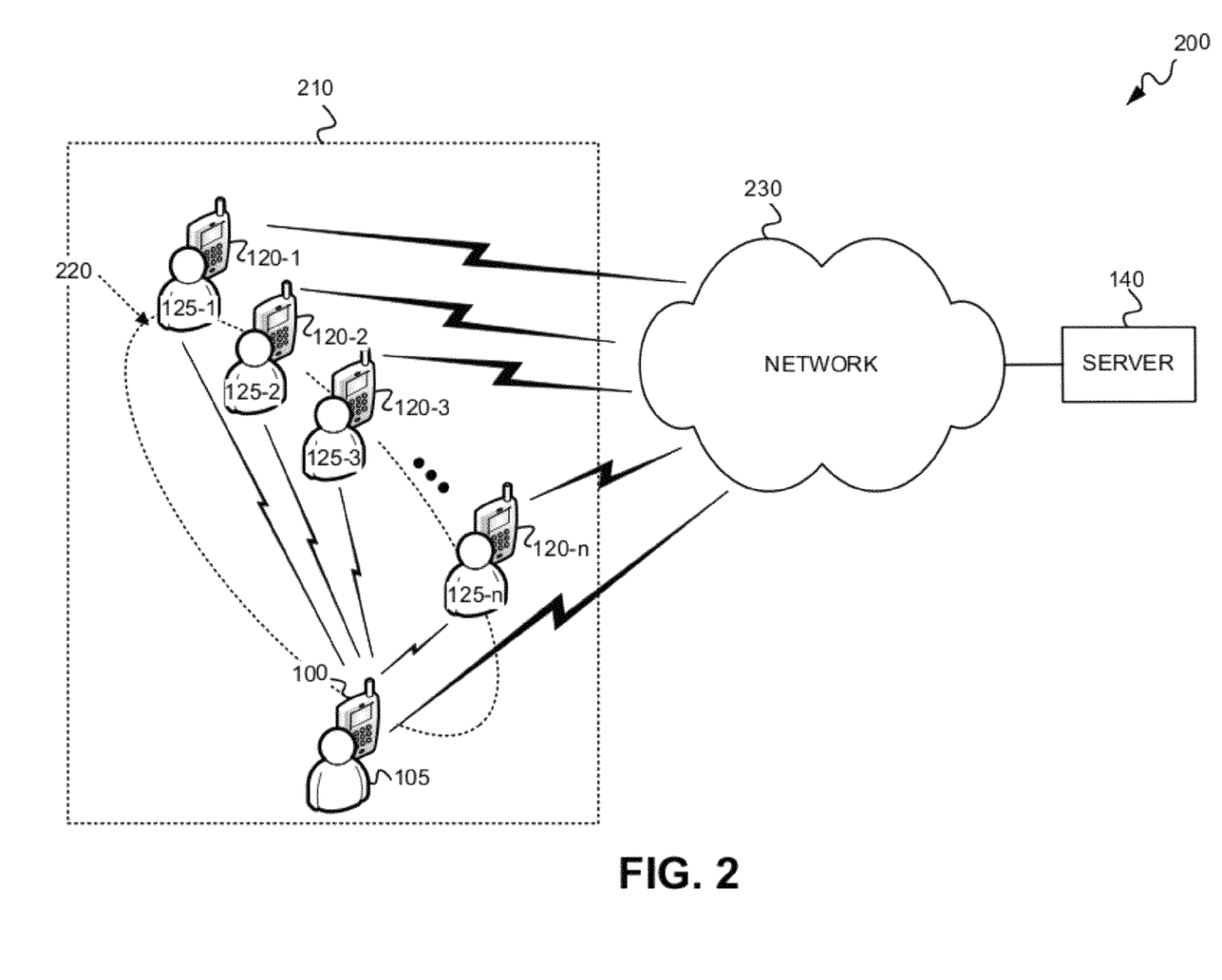
FIG. 2 is a diagram that depicts an exemplary environment in which the detection of other devices that are proximate to the mobile device of FIG. 1 at a meeting may used to verify calendar information stored at a calendar application at the mobile device.

FIG. 2 is a diagram that depicts an exemplary environment 200 in which the detection of other devices that are proximate to mobile device 100 at a meeting may be used to verify calendar information stored at calendar app 110 at mobile device 100. As shown in FIG. 2, a meeting 210 may occur at a specific time and location. Multiple invited meeting participants 125-1 through 125-n, using their respective mobile devices 120-1 through 120-n, may be present at meeting 210. User 105, using mobile device 100, may or may not be present at meeting 210. Each of devices 120-1 through 120-n, and mobile device 100, may be able to communicate with network 230 using wireless connections. Server 140 may connect to network 230 such that devices 120-1 through 120-n and mobile device 100 may send and/or receive messages to/from server 140 via network 230. Network 230 may include a wireless network and possibly other types of networks. The wireless network may include, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs). The other types of networks may include one or more telecommunications networks (e.g., Public Switched Telephone Networks (PSTNs)), LANs, WANs, metropolitan area networks (MANs), an intranet, the Internet, or a cable network (e.g., an optical cable network). Devices 120-1 through 120-n and mobile device 100 may use appropriate wireless network protocols for communicating via network 230.

As further shown in FIG. 2, each of devices 120-1 through 120-n and mobile device 100 may communicate with one another via short range wireless protocols over different wireless connections than those used to communicate with network 230. The short range wireless protocols may include, for example, BlueTooth that may be used to create a Personal Area Network (PAN) 220. Mobile device 100 may receive LCID information from each of devices 120-1 through 120-n via the short range wireless protocols of PAN 220.

The configuration of environment 200 depicted in FIG. 2 is for illustrative purposes only. It should be understood that other configurations may be implemented. Therefore, environment 200 may include additional, fewer and/or different components than those depicted in FIG. 2.

Figure 3:
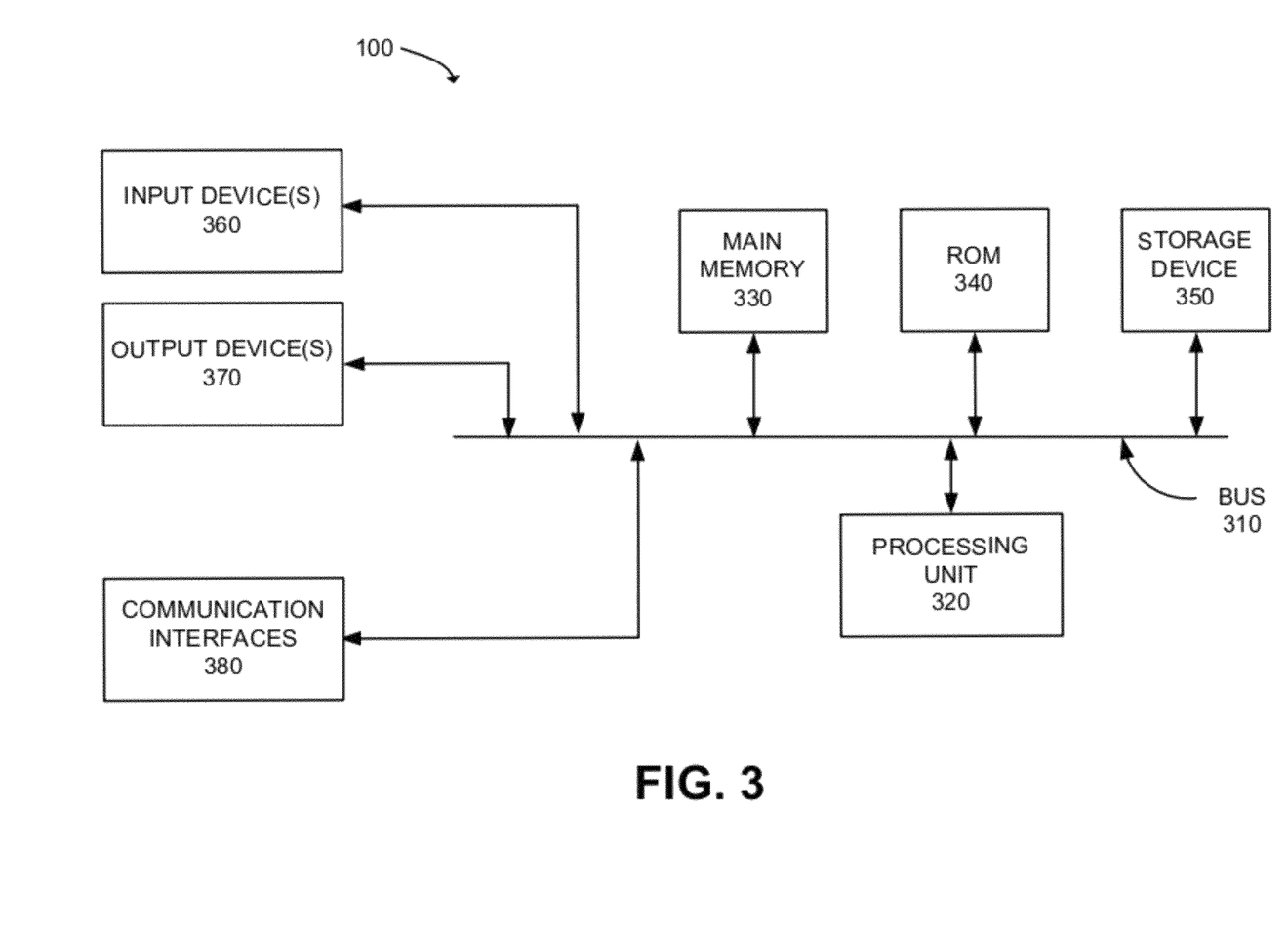
FIG. 3 is a diagram that depicts exemplary components of the mobile device of FIG. 1.

FIG. 3 is a diagram that depicts exemplary components of mobile device 100. Server 140 and devices 120-1 through 120-n may be configured similarly. Device 100 may include a bus 310, a processing unit 320, a main memory 330, a read only memory (ROM) 340, a storage device 350, an input device(s) 360, an output device(s) 370, and communication interfaces 380. Bus 310 may include a path that permits communication among the elements of device 100.

Processing unit 320 may include one or more processors, microprocessors, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive. Storage device 350 may further include a flash drive.

Input device(s) 360 may permit a user to input information to device 100, such as, for example, a keypad or a keyboard, voice recognition and/or biometric mechanisms, etc. Additionally, input device(s) 360 may include a touch screen display having a touch panel that permits touch input by the user. Output device(s) 370 may output information to the user, such as, for example, a display, a speaker, etc. Additionally, output device(s) 370 may include a touch screen display where the display outputs information to the user. Communication interfaces 380 may include multiple communication interfaces that enable device 100 to communicate with other devices and/or systems. Communication interfaces 380 may communicate with another device or system via a network, such as network 230. For example, communication interfaces 380 may include a radio transceiver for communicating with network 230 via wireless radio channels over a first wireless connection. As another example, communication interfaces 380 may include a radio transceiver for communicating with devices 120-1 through 120-n via short range wireless protocols (e.g., BlueTooth) over a second wireless connection.

Device 100 may perform certain operations or processes, as described in detail below. Device 100 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices.

The software instructions may be read into main memory 330 from another computer-readable medium, such as storage device 350, or from another device via communication interfaces 380. The software instructions contained in main memory 330 may cause processing unit 320 to perform operations or processes that are described below. Alternatively, hardwired circuitry may be used in place of or in combination with software instructions to implement processes consistent with different embodiments of device 100. Thus, exemplary implementations are not limited to any specific combination of hardware circuitry and software.

The configuration of components of device 100 illustrated in FIG. 3 is for illustrative purposes only. It should be understood that other configurations may be implemented. Therefore, device 100 may include additional, fewer and/or different components than those depicted in FIG. 3.

Figure 4:
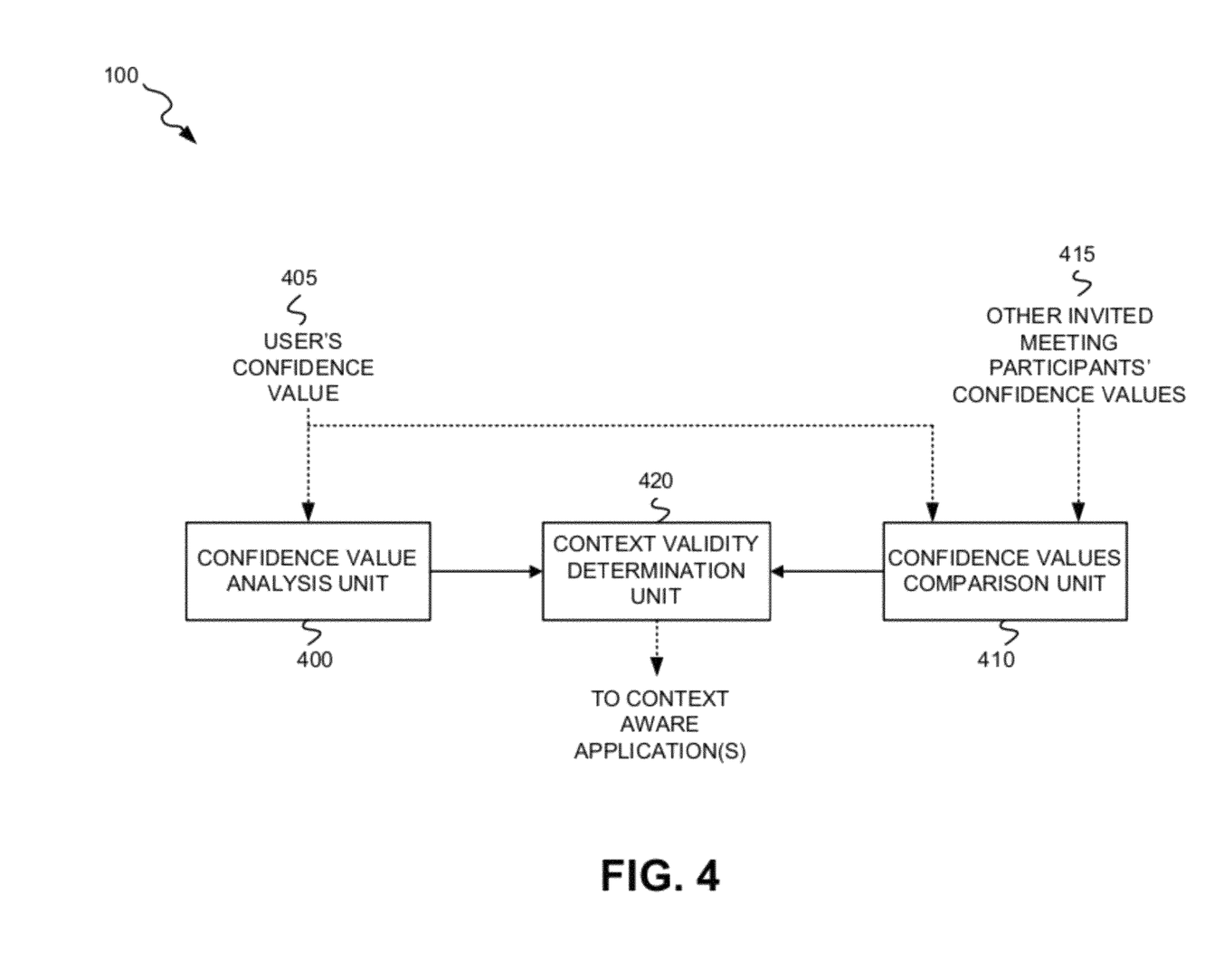
FIG. 4 is a diagram that depicts exemplary functional components of the mobile device of FIG. 1.

FIG. 4 is a diagram that depicts exemplary functional components of mobile device 100. The functional components of mobile device 100 shown in FIG. 4 may be implemented by processing unit 320 in conjunction with other components of mobile device 100 (e.g., main memory 330, communication interfaces 380). The functional components of mobile device 100 may include a confidence value analysis unit 400, a confidence values comparison unit 410, and a context validity determination unit 420.

Confidence value analysis unit 400 may analyze user 105's confidence value 405, received from server 140, to determine a likelihood that user 105 is actually present at a currently scheduled meeting. Unit 400 may also take into account a determined location of user 105. The higher the value of confidence value 405, the greater the likelihood that user 105 is present at the meeting, and that the meeting is a valid context for user 105 for purposes of executing certain context aware applications. Confidence values comparison unit 410 may compare user 105's confidence value 405 with the confidence values 415 of other invited meeting participants received from server 140. If the confidence value of user 105 (user A) is higher than zero, indicating that user 105 is in proximity to someone invited to the meeting, but lower than the value for another invited meeting participant (user B) at the same meeting, then most of the meeting participants are in proximity to the other invited meeting participant (user B), while some invited participants are in proximity to user 105 (user A). Therefore, user B is more likely to be in the meeting than user A. A ranking of the confidence values of user 105, and the other invited meeting participants, from highest to lowest provides an indication of which meeting participants are most likely to be present at the meeting.

Context validity determination unit 420 may determine, based on the analysis of user 105's confidence value performed by unit 400 or based on the confidence value comparison performed by unit 410, whether a meeting currently scheduled by calendar application 110 is a valid context for user 105. Unit 420 may provide a control signal(s) to context aware application(s) 115 to cause application(s) 115 to execute if a meeting currently scheduled by calendar application 110 is determined to be a valid context for user 105.

Figure 5:
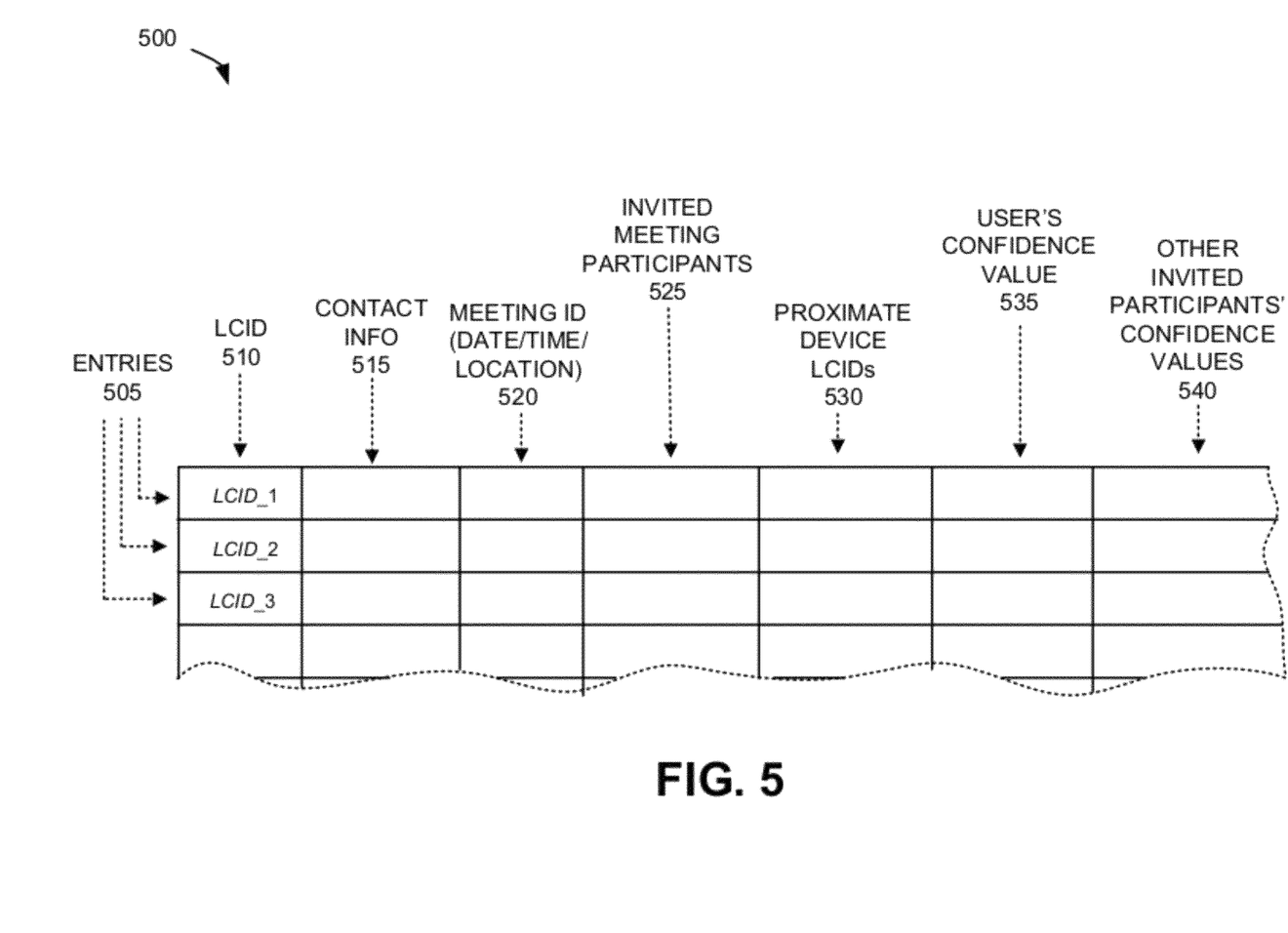
FIG. 5 is a diagram that depicts an exemplary table that may store entries associated with each device that has registered and published its Local Connectivity Identification to the server of FIG. 1.

FIG. 5 depicts an exemplary table 500 that may be stored in a memory of server 140 that may store entries associated with each device that has registered and published its LCID to server 140. For example, table 500 may be stored in main memory 330, or storage device 350, of server 140. Table 500 may include multiple table entries 505, each of which may include multiple fields including, for example, a LCID field 510, a contact information field 515, a meeting ID field 520, an invited meeting participants field 525, a proximate device LCIDs field 530, a user's confidence value field 535, and other invited participants' confidence values field 540.

LCID field 510 may include a LCID of a device that has registered with server 140 and has published its LCID to server 140. The LCID may include any type of unique identifier which is valid within the wireless protocol that may be used to send a LCID from a device to another device. The LCID information may include a network address, such as, for example, a Medium Access Control (MAC) address (e.g., a BlueTooth MAC address) associated with the device that registered with server 140.

Contact info field 515 may include various items of data associated with the user that uses the device that provided the LCID of LCID field 510 to server 140. The various items of data may include, for example, a phone number, an email address, a residence address, a business address, etc.

Meeting ID field 520 may include information that identifies a meeting scheduled at a calendar application installed at the device from which the LCID stored in LCID field 510 was received. The information may include a title of the meeting and/or a date, time and location of the meeting. Invited meeting participants field 525 may identify individuals invited to the meeting identified in field 520. Proximate device LCIDs field 530 may store LCIDs of devices that are detected as being proximate to the device having the LCID stored in LCID field 510.

User's confidence value field 535 may store a calculated confidence value that indicates a likelihood that the user of the device having the LCID value stored in LCID field 510 may be present at the meeting identified in field 520. Other invited participants' confidence values field 540 may store confidence values of other invited meeting participants to the meeting identified in field 520.

Exemplary Process

Figure 6A:
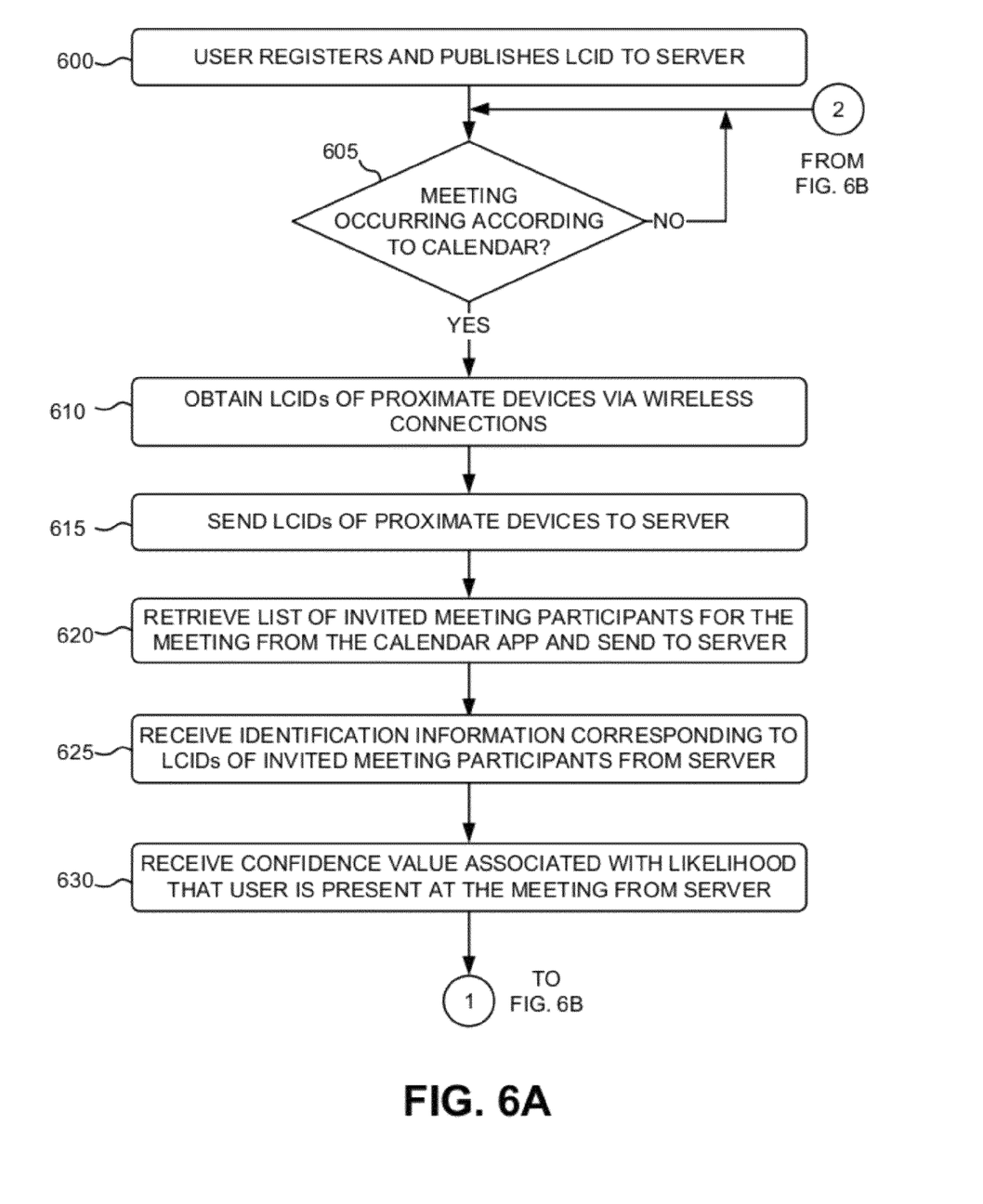
FIGS. 6A and 6B are flow diagrams illustrating an exemplary process for verifying calendar information associated with a calendar application installed at the mobile device of FIG. 1, and for selective execution of a function associated with a context aware application(s) installed at the mobile device, based on proximate device detection.
Figure 6B:
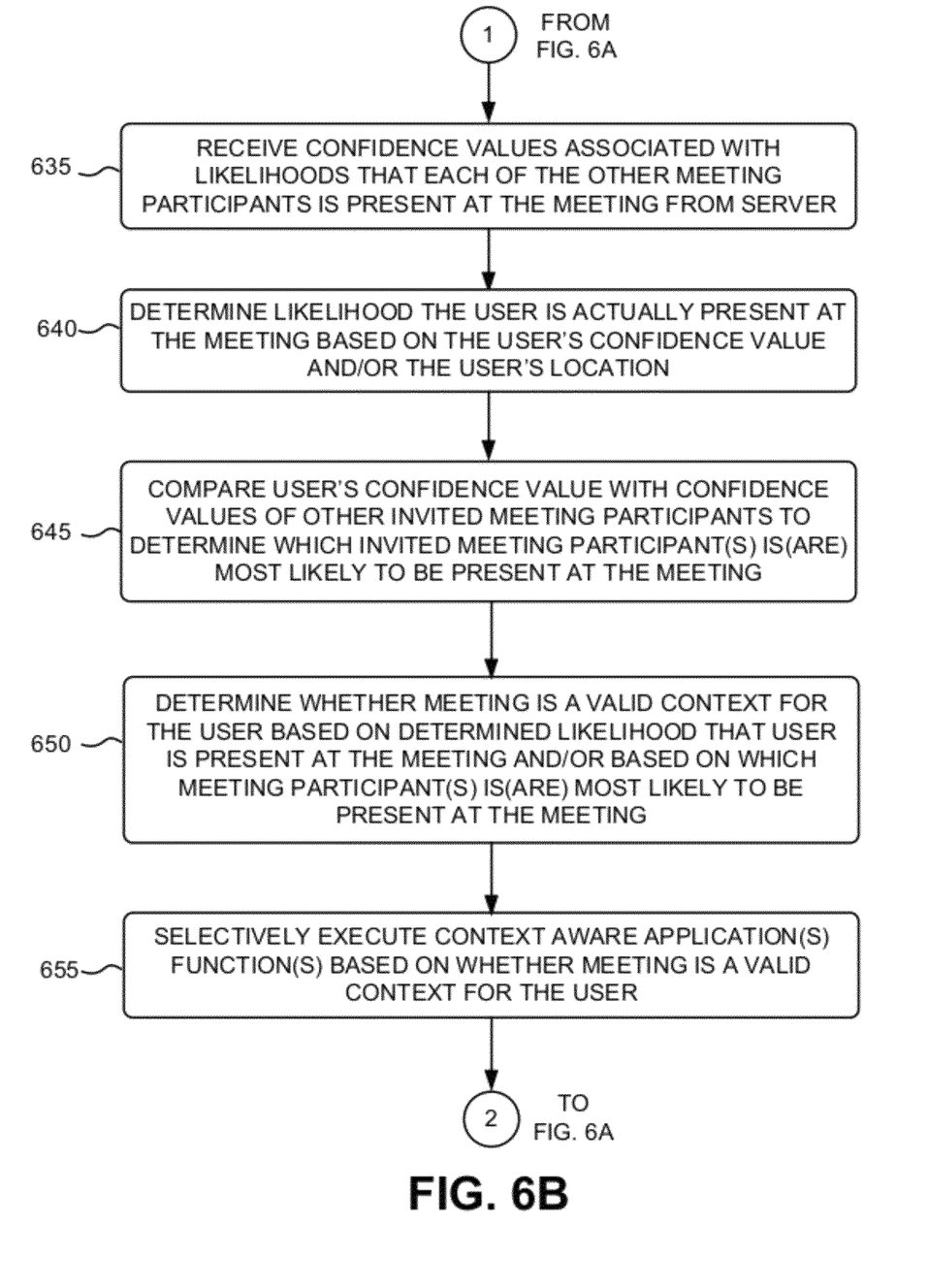

FIGS. 6A and 6B are flow diagrams illustrating an exemplary process for verifying calendar information associated with calendar application 110, and for selective execution of a function associated with context aware application(s) 115, based on proximate device detection. The exemplary process of FIGS. 6A and 6B may be implemented by mobile device 100. The exemplary process of FIGS. 6A and 6B is described below with reference to FIGS. 7 and 8.

Figure 7:
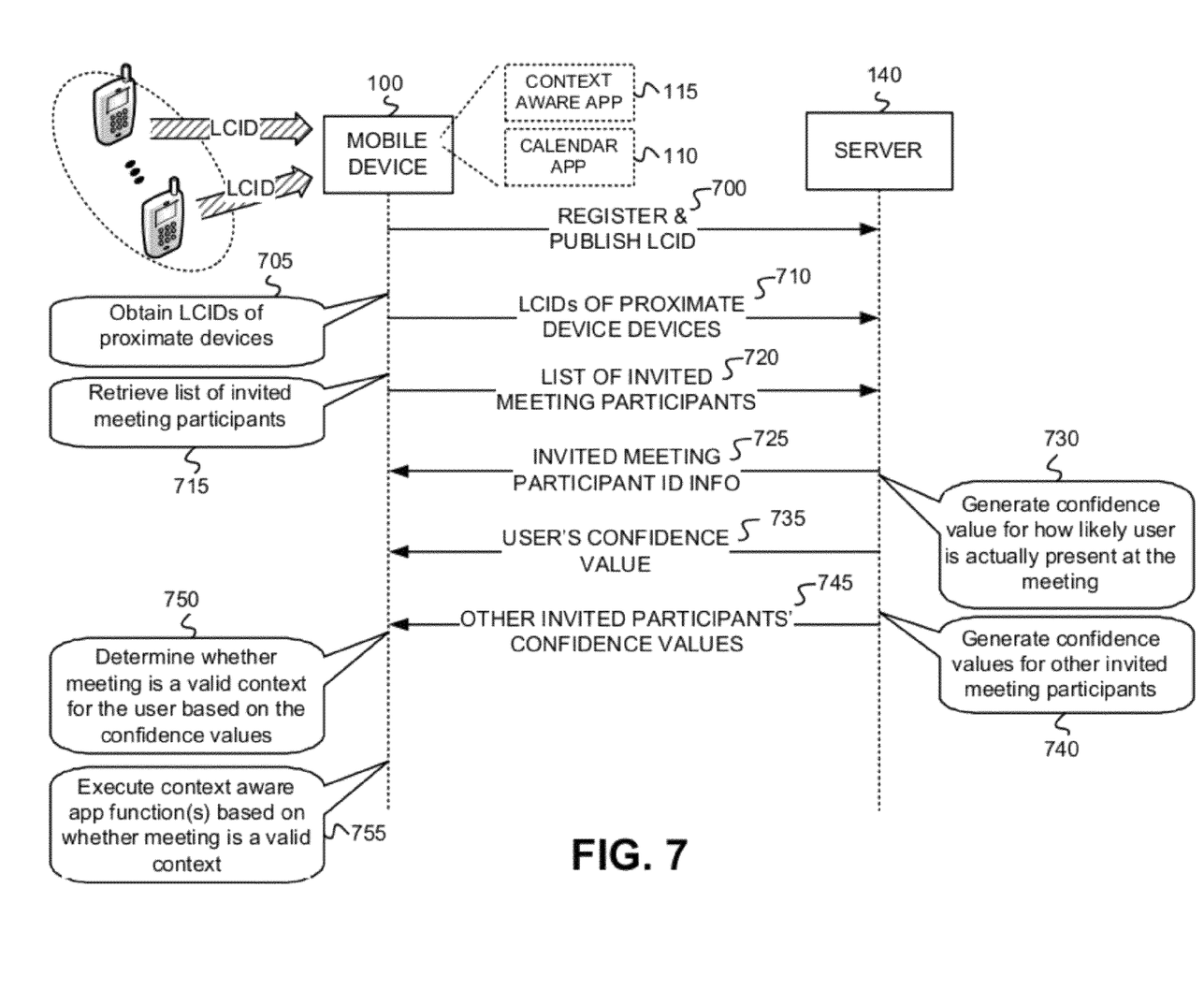
FIG. 7 is a diagram that depicts exemplary messaging associated with the exemplary process of FIGS. 6A and 6B.

The exemplary process may include user 105 registering and publishing device 100's LCID to server 140 (block 600). User 105 may send, via mobile device 100, user 105's contact information to server 140, where the contact information may include user 105's name, telephone number, email address, residence address, etc. Mobile device 100 may additionally obtain its own LCID and may "publish" the LCID to server 140. Mobile device 100 may obtain its own LCID via the short range wireless protocol (e.g., BlueTooth) used to communicate with proximate devices 120-1 through 120-n. Server 140 may store the received LCID in a LCID field 510 of an entry 505, and may store user 105's contact information in a contact information field 515 of the same entry 505. FIG. 7 depicts mobile device 100 registering 700 and publishing mobile device 100's LCID to server 140.

Mobile device 100 may determine whether a meeting is occurring according to calendar application 110 (block 605). Mobile device 100 may retrieve meeting scheduling information from calendar application 110 and determine if the current time and date is close enough to a scheduled meeting. For example, if the current time is 10 minutes prior to a meeting scheduled in calendar application 110, then mobile device 100 may determine that a meeting is occurring, or is about to occur.

If a meeting is occurring, or is about to occur (YES—block 605), then mobile device 100 may obtain LCIDs of proximate devices via wireless connections (block 610). Mobile device

100 may obtain the LCIDs from each device 120-1 through 120-n that is within a certain distance of mobile device 100. For example, if BlueTooth (BT) protocol is used, then mobile device 100 may obtain the LCIDs (e.g., BT MAC addresses) from each one of devices 120-1 through 120-n that is within a detectable range of mobile device 100 (e.g., within approximately 10 meters for a Class 2 power-class device). FIG. 7 depicts mobile device 100 obtaining 705 LCIDs from other devices that are proximate to mobile device 100.

Mobile device 100 may send the LCIDs of the proximate devices to server 140 (block 615). Mobile device 100 may locally store the LCIDs of the proximate devices obtained in block 610, and then send a list that contains the LCIDs to server 140 via network 230. FIG. 7 shows mobile device 100 sending the LCIDs 710 of the devices that are proximate to mobile device 100 to server 140. Mobile device 100 may retrieve or access a list of invited meeting participants for the meeting from calendar application 110 and send the list to server 140 (block 620). FIG. 7 depicts mobile device 100 retrieving 715 the list of invited meeting participants for the currently occurring scheduled meeting from calendar application 110, and sending the list 720 of invited meeting participants to server 140. Upon receipt of LCIDs 710 of the proximate devices, and the list 720 of invited meeting participants, server 140 may store LCIDs 710 of the proximate devices in proximate device LCIDs field 530 of an entry corresponding to user 105's LCID 510. Server 140 may further store the list 720 of invited meeting participants in field 525 of an entry 505 of table 500 corresponding to user 105's LCID 510.

Mobile device 100 may receive identification information corresponding to LCIDs of invited meeting participants from server 140 (block 625). Upon receipt of the invited meeting participant list from mobile device 100, server 140 may determine the invited meeting participants that are associated with the proximate devices from which LCIDs were obtained. Server 140 may index table 500 with a LCID of each invited meeting participant that is associated with a proximate device to retrieve corresponding contact information from field 515. The contact information may include information that identifies the user of the proximate device (e.g., name, email address, telephone number, IM screen name, etc.). Server 140 may return the retrieved identification information to mobile device 100. FIG. 7 depicts server 140 sending invited meeting participant ID information 725 to mobile device 100.

Mobile device 100 may receive a confidence value associated with a likelihood that user 105 is present at the meeting from server 140 (block 630). As shown in FIG. 7, server 140 may generate 730 a confidence value that indicates a likelihood that user 105 is actually present at the meeting. Server 140 may generate the confidence value by determining a size of the intersection between the set of all invited meeting participants and the set of proximate devices, divided by the size of the set of invited meeting participants. For example, if there are 10 invited meeting participants, of which 5 are associated with detected proximate devices, then the confidence value would equal $5/10 = 0.5$. Server 140 may send user 105's confidence value 735 to mobile device 100.

Mobile device 100 may receive confidence values associated with likelihoods that each of the other meeting participants is present at the meeting from server 140 (block 635). As shown in FIG. 7, server 140 may generate 740 confidence values for the other invited meeting participants of the scheduled meeting. For each invited meeting participant, server 140 may determine a size of the intersection between the set of all invited meeting participants and the set of proximate devices to that meeting participant, divided by the size of the set of all invited meeting participants. For example, if there are 10 invited meeting participants, of which 3 are associated with devices that are detected as being proximate to invited meeting participant A, then the confidence value for participant A would equal $3/10 = 0.3$. Server 140 may, thus, generate a confidence value for each of the invited meeting participants for a given scheduled meeting. As shown in FIG. 7, server 140 may send the other invited participants' confidence values 745 to mobile device 100.

Mobile device 100 may determine the likelihood that user 105 is actually present at the meeting based on the user's confidence value and/or the user's location (block 640). Mobile device 100 may obtain a relatively coarse location of mobile device 100 such as, for example, a radio base station cell ID or a wireless network access point ID (e.g., "wi-fi" access point ID). In other instances, mobile device 100 may obtain a more precise location, such as a location via Global Positioning System (GPS). Mobile device 100 may compare this obtained coarse location with the location of the scheduling meeting to determine how close user 105 is to the location of the scheduled meeting. The closer mobile device 100 is to the location of the scheduled meeting, the greater the likelihood that user 105 is actually present at the meeting. Mobile device 100 may determine a magnitude of user 105's confidence value. The closer the magnitude of user 105's confidence value is to the value 1.0, the greater the likelihood that user 105 is actually present at the meeting.

Mobile device 100 may compare the user's confidence value with confidence values of other invited meeting participants to determine which invited meeting participant(s) is(are) most likely to be present at the meeting (block 645). If the confidence value of user 105 is greater than zero (indicating that user 105 is in proximity to someone invited to the meeting), but lower than the confidence value for another invited meeting participant B (for the same meeting), then participant B may be more likely to be at the meeting than user 105. For example, if user 105 has a confidence value of 0.3, and participant B has a confidence value of 0.7, then participant B is more likely to be at the meeting than user 105. The received confidence values for all invited meeting participants may be ranked to determine which participant(s) have the highest confidence value and, therefore, is most likely to be present at the meeting.

Mobile device 100 may determine whether the meeting is a valid context for the user based on the determined likelihood that user 105 is present at the meeting and/or based on which meeting participant(s) is(are) most likely to be present at the meeting (block 650). Mobile device 100, based on the results of blocks 640 and/or 645, may determine whether the scheduled meeting is a valid context for user 105 (i.e., user 105 is actually present at the meeting for purposes of verifying calendar information or for selectively executing a context aware application(s)). FIG. 7 depicts mobile device 100 determining 750 whether the scheduled meeting is a valid context for user 105 based on the confidence values analyzed in blocks 640 and/or 645.

Mobile device 100 may selectively execute a function(s) of context aware application(s) 115 based on whether the meeting is determined to be a valid context for user 105 (block 655). As shown in FIG. 7, mobile device 100 may execute 755 a context aware application function based on whether the meeting is determined to be a valid context. Mobile device 100 may control context aware application(s) 115 to selectively execute one or more functions, such as, for example, switching mobile device 100 to a "silent" mode, or routing incoming calls to voicemail based on a determined context of user 105 and/or mobile device 100. For example, if it is determined that user 105 is actually physically present at a meeting currently scheduled in calendar application 110, then context aware application 115 may switch mobile device 100 to a "silent" mode such that mobile device 100 does not ring, but only vibrates, when incoming calls and/or messages are received. Other functions of context aware application(s) 115 associated with the determined context of user 105 and/or device 100 may be selectively executed, such as, for example, displaying meeting information on device 100, including invited participant information, information showing which invited participants are actually present at the meeting, and/or documents attached to the meeting invitation. The documents that may be displayed at device 100 may include a flyer associated with the meeting, program information associated with the meeting, reference materials for use during the meeting, etc.

Figure 8:
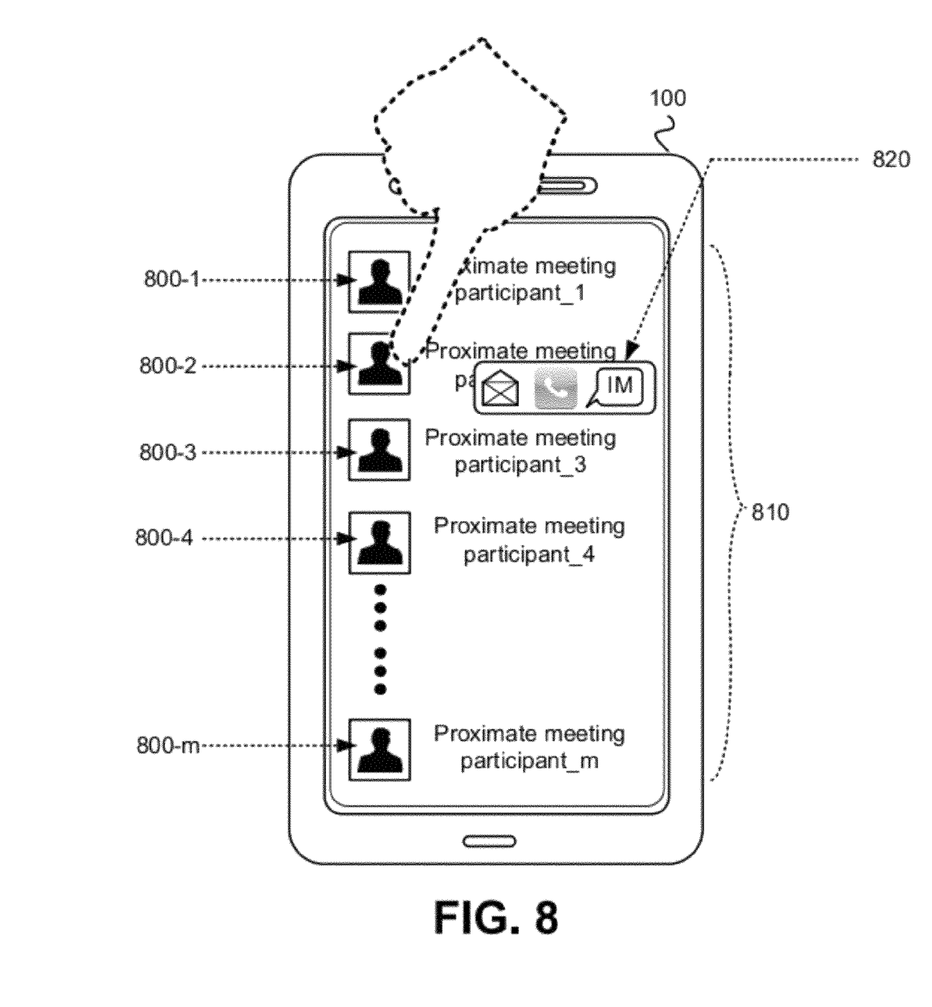
FIG. 8 is a diagram that depicts a mobile device screen display that displays meeting participants who are present at the meeting.

FIG. 8 depicts an example of the execution of a function of a context aware application where icons 800-1 through 800-*x*, and associated contact information, of other invited meeting participants that are detected as being proximate to mobile device 100 are displayed on mobile device 100 when user 105 is determined to be present at the scheduled meeting. Upon a selection of any one of icons 800-1 through 800-*x* (e.g., via a "touch" upon a touch screen display 810 as shown in FIG. 8), a menu 820 may be displayed that permits user 105 of mobile device 100 to select one of multiple different ways of contacting the selected meeting participants. The different ways may include, for example, contact via email, a telephone call, or Instant Message (IM). Upon selection (e.g., via a touch to touch screen display 810) of one of the ways of contacting the selected meeting participant, mobile phone 100 may initiate the contact via the selected mechanism (e.g., email, call, or IM).

CONCLUSION

Implementations described herein enable the verification of calendar information stored at a mobile device based on the detection of other devices that are proximate to the mobile device. Detection of the other devices that are proximate to the mobile device may include receiving LCIDs from the proximate devices via short range wireless protocols, such as, for example, BlueTooth. Context aware applications installed at the mobile device may selectively execute functions based on data related to the LCIDs received from the other devices. For example, the functions of the context aware applications may be executed based on a determination of the likelihood that the user of the mobile device is actually physically present at a meeting scheduled in the calendar application installed at the mobile device.

The foregoing description of the embodiments described herein provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A and 6B, the order of the blocks may be varied in other implementations. Moreover, non-dependent blocks may be performed in parallel. The exemplary process of FIGS. 6A and 6B describe exemplary operations that are performed by mobile device 100, with some operations being performed by server 140 (e.g., shown as 730 and 740 in FIG. 7). However, the exemplary operations described with respect to FIGS. 6A, 6B and 7 may be distributed among mobile device 100, server 140, or another node (not shown) in a different fashion. For example, mobile device 100 may perform confidence value generation instead of server 140, or server 140 may perform valid context determination instead of mobile device 10.

Certain features described herein may be implemented as "logic" or as a "unit" that performs one or more functions. This logic or unit may include hardware, such as one or more processors, microprocessors, application specific integrated circuits, or field programmable gate arrays, software, or a combination of hardware and software.

The term "comprises" or "comprising" as used herein, including the claims, specifies the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

What is claimed is:

1. A method, comprising:
   obtaining, at a mobile device associated with a user, local connectivity identification (LCID) information over short range wireless protocol connections from one or more proximate mobile user devices, carried by one or more other users, that are proximate to the mobile device;
   retrieving a list of invited participants to a meeting from a calendar application installed at the mobile device;
   obtaining user identification information associated with ones of the invited participants that are associated with the one or more proximate mobile user devices from which the LCID information was obtained over the short range wireless protocol connections;
   obtaining a confidence value that is associated with a likelihood that the user is physically present at the meeting based on data related to the LCID information;
   determining whether the meeting is a valid context for the user based on the confidence value; and
   selectively executing one or more functions associated with at least one context aware application installed at the mobile device based on whether the meeting is a valid context for the user.

2. The method of claim 1, further comprising:
   obtaining confidence values associated with the invited participants to the meeting; and
   comparing the confidence values associated with the invited participants with the confidence value that is associated with a likelihood that the user is physically present at the meeting.

3. The method of claim 2, wherein determining whether the meeting is a valid context for the user is further based on the comparison of the confidence values associated with the invited participants with the confidence value that is associated with the likelihood that the user is physically present at the meeting.

4. The method of claim 1, wherein the LCID information comprises network addresses associated with the one or more proximate mobile user devices.

5. The method of claim 4, wherein the network addresses comprise BlueTooth MAC addresses.

6. The method of claim 1, further comprising:
   obtaining location information associated with the mobile device, and wherein determining whether the meeting is a valid context for the user is further based on the obtained location information.

7. The method of claim 6, wherein the location information comprises a radio base station cell identifier or a wireless network access point identifier associated with a location of the mobile device.

8. The method of claim 1, further comprising:
determining, from the calendar application, whether the meeting is actually currently occurring, or is about to occur; and
wherein obtaining the LCID information from the one or more devices is based on whether the meeting is currently occurring or is about to occur.

9. The method of claim 1, wherein selectively executing the one or more functions comprises one of:
switching the mobile device to a silent mode such that mobile device does not ring, but only vibrates or displays a visual indication, when incoming calls and/or messages are received;
routing incoming calls to voicemail based on whether the meeting is a valid context for the user; or
displaying information associated with the meeting on the mobile device, wherein the information includes at least one of invited participant information, information showing which invited participants are actually present at the meeting, or documents associated with the meeting.

10. The method of claim 1, wherein the short range wireless protocol is associated with a Personal Area Network (PAN).

11. The method of claim 1, wherein the short range wireless protocol comprises BlueTooth.

12. A device, comprising:
a memory configured to store a context aware application and a calendar application that further stores data related to a scheduled meeting;
a first communication interface configured to receive local connectivity identification (LCID) information transmitted over short range wireless protocol connections from one or more other proximate mobile user devices, carried by one or more other users, that are proximate to the device, wherein the LCID information comprises network addresses of the one or more other proximate mobile user devices; and
a processing unit configured to retrieve a list of invited participants to the scheduled meeting,
a second communication interface configured to:
send the LCID information and the list of invited participants to a server, and
receive a confidence value, generated by the server based on the LCID information, that indicates a likelihood that a user of the device is present at the scheduled meeting;
wherein the processing unit is further configured to:
determine a likelihood that the user of the device is present at the scheduled meeting based on data related to the received LCID information from the one or more other proximate mobile user devices wherein the data related to the received LCID information comprises the confidence value, and
selectively execute a function associated with a context aware application based on the likelihood that the user is present at the scheduled meeting.

13. The device of claim 12, wherein the second communication interface is further configured to receive confidence values associated with a plurality of invited participants to the scheduled meeting, and
wherein the data related to the received LCID information comprises the received confidences values associated with the plurality of invited participants.

14. The device of claim 12, wherein the LCID information comprises Medium Access Control (MAC) addresses associated with the one or more other proximate mobile user devices that are proximate to the device.

15. The device of claim 12, wherein the device comprises a desktop, laptop, palmtop, or tablet computer; a cellular telephone; a personal digital assistant (PDA); a media player device; or a digital camera.

16. The device of claim 12, wherein, when selectively executing the function, the processing unit is configured to:
switch the device to a silent mode such that the device does not ring, but only vibrates or displays a visual indication, when incoming calls and/or messages are received.

17. The device of claim 12, wherein, when selectively executing the function, the processing unit is configured to:
route incoming calls to voicemail based on the likelihood that the user is present at the scheduled meeting.

18. The device of claim 12, wherein, when selectively executing the function, the processing unit is configured to:
display information associated with the meeting on the device, wherein the information includes at least one of invited participant information, information showing which invited participants are actually present at the meeting, or documents associated with the meeting.

19. A non-transitory computer-readable medium containing instructions executable by at least one processing unit, the computer readable medium comprising:
one or more instructions for managing calendar information associated with a calendar application installed at a mobile device;
one or more instructions for obtaining network addresses over short range wireless protocol connections from one or more proximate mobile user devices, carried by one or more users, that are proximate to the mobile device, wherein the network addresses comprise Medium Access Control (MAC) addresses associated with the one or more proximate mobile user devices; and
one or more instructions for verifying at least a portion of the calendar information based on the obtained network addresses from the one or more proximate mobile user devices.

* * * * *